H. Hannen.

Utilizing Waste Products of Combustion.

No. 3688. Reissued Oct. 26. 1869.

Witnesses.
Fred. Artos
J. F. Colby

Inventor.
Henry S. Hannen
By D. A. Carlson
Attorney

UNITED STATES PATENT OFFICE.

HENRY HANNEN, THOMAS WOODS, AND BENJAMIN F. PINE, OF PHILADELPHIA, PENNSYLVANIA, ASSIGNEES OF HENRY HANNEN.

IMPROVED PROCESS OF UTILIZING THE WASTE PRODUCTS OF COMBUSTION FOR THE MANUFACTURE OF WHITE LEAD AND FOR OTHER PURPOSES.

Specification forming part of Letters Patent No. 86,835, dated February 9, 1869; antedated February 1, 1869; Reissue No. 3,688, dated October 26, 1869.

*To all whom it may concern:*

Be it known that HENRY HANNEN, of the city of Philadelphia and State of Pennsylvania, has invented a new Mode or Process of Utilizing the Waste Products of Combustion; and we do declare the following to be a full and exact description of the same.

The invention consists in part in the devices by which the unconsumed gaseous products of combustion are withdrawn from the chimney and conducted to chambers for further treatment.

The invention also consists in forcing those gaseous products of combustion which are usually permitted to escape into the atmosphere through water impregnated with chlorine, or its equivalent, as a purifying element, thus producing a pure carbonic-acid gas available for vari s manufactures.

It also further consists in accumulating the said gas under pressure produced by the same force used in the purifying process.

To enable others to practice the invention, the following description is given, in which reference is had to the drawings which accompany and form a part of these specifications, and in which—

Figure 1:
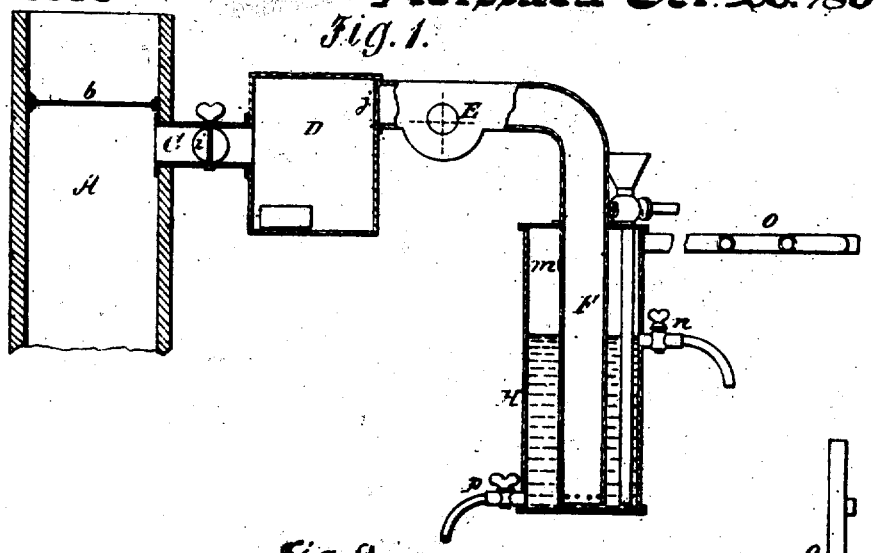
Figure 2:
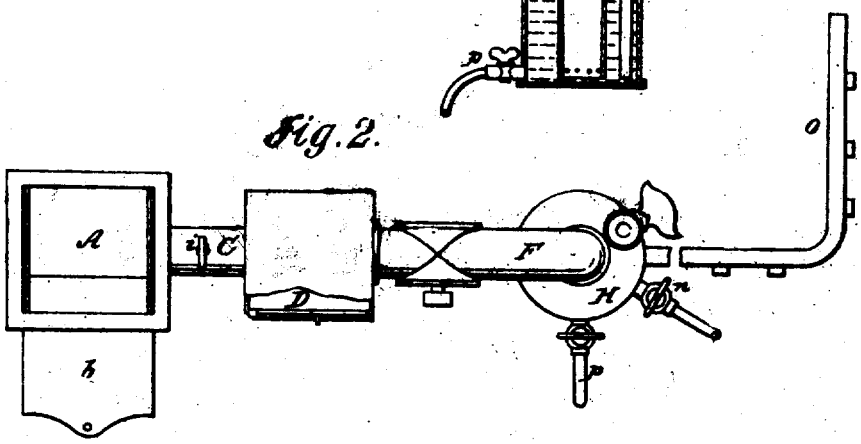
Figure 3:
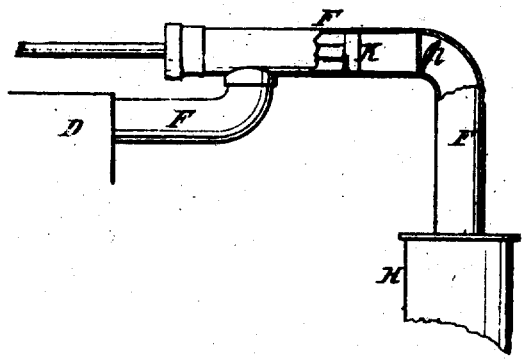

Figure 1 is a sectional elevation of apparatus that may be employed in practicing the invention; Fig. 2, plan view of same arrangement of apparatus; Fig. 3, detached view of parts in which a pump is exhibited in place of the fan of Fig. 1.

A represents a portion of the chimney or smoke-conduit of any furnace or fire-place; *b*, a sliding damper to remain open until the fuel is ignited; C, a pipe leading off from the chimney A just below the damper *b*, and terminating within the chamber D; D, a chamber into which the unconsumed gaseous products of the chimney A are first received; E, a fan by which the contents of the chamber D are withdrawn and forced through the pipe F into the close vessel or receiver H; F, a pipe leading from chamber D to reservoir H, and may be supplied with fan E, as in Fig. 1, or with pump, as in Fig. 3; H, a reservoir which may be seven or eight feet in height, having chlorinated water, or its equivalent, rising from two or four feet therein; *i*, a valve at the entrance of the pipe C, to be opened when *b* is closed and the apparatus working; *j*, a screen at the entrance of the pipe F, to prevent the passage of cinders and the like; *g*, funnel and stop-cock through which the liquid contents of the reservoir H are supplied; K, a pump-piston containing a pump-valve; *l*, another valve acting in connection with piston K; *m*, space or chamber in upper part of reservoir H, in which is accumulated under pressure of the fan or pump the purified carbonic-acid gas; *n*, cock for regulating the depth of water in the vessel H; O, pipe through which this gas is withdrawn for use in the manufacture of carbonate of soda, carbonate of lead, or other purposes; P, a cock for withdrawing the watery contents of vessel H.

In using the above-described apparatus, having opened the valve *i* and closed the damper *b*, the fan E, or the pump K, (when pump is used,) is set in motion, and the unconsumed gaseous products of combustion are drawn first to the chamber D, and, leaving the cinders and the like there, enter pipe F, whence the fan E or pump K forces them through the descending arm of said pipe F, discharging them into the chlorinated water within and near the bottom of the vessel H. These products in passing through the chlorinated water became purified and a pure carbonic-acid gas is gathered therefrom, under pressue, in the chamber *m*, whence it may be ejected without other forcing appliance to its legitimate uses for manufacturing or other purposes.

It will be understood that although specific apparatus for carrying out the invention has been described, it is not confined to this form, as the same may be modified and other substituted for that explained and illustrated.

What is claimed, and desired to be secured by Letters Patent, is—

1. The production of carbonic-acid gas from the waste gaseous products of combustion and gathering the same under pressure produced by hydrostatic column, in the manner and by the apparatus described.

2. Purifying carbonic-acid gas arising from the combustion of fuel by passing the same through water impregnated with chlorine, or its equivalent, for the purposes specified.

HENRY HANNEN.
THOMAS WOODS.
BENJAMIN F. PINE.

Witnesses:
D. C. COLBY,
J. B. BROGDEN.